May 22, 1923.
J. A. DOBLE
STEAM POWER PLANT
Filed June 19, 1919
1,456,226
2 Sheets-Sheet 2
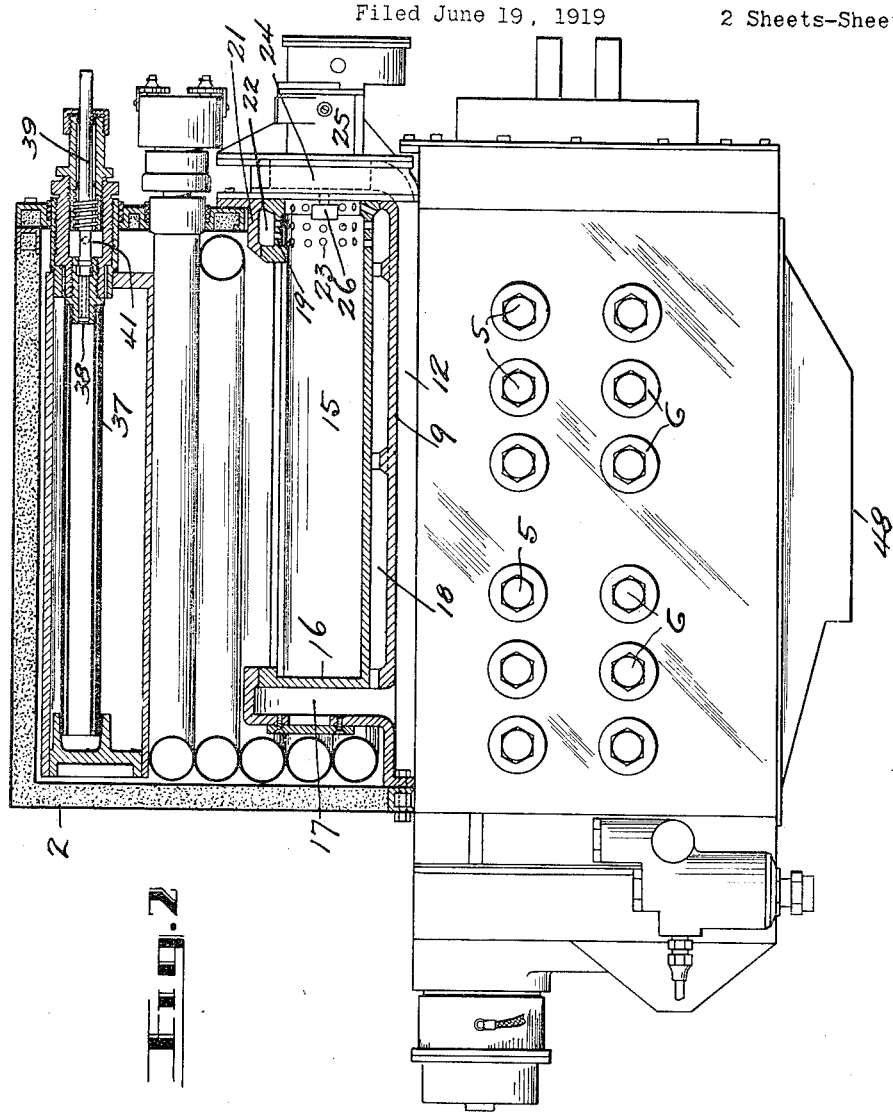
Witness:
H. A. Sherburne.
INVENTOR.
J. A. DOBLE
BY White & Prost
his ATTORNEYS.

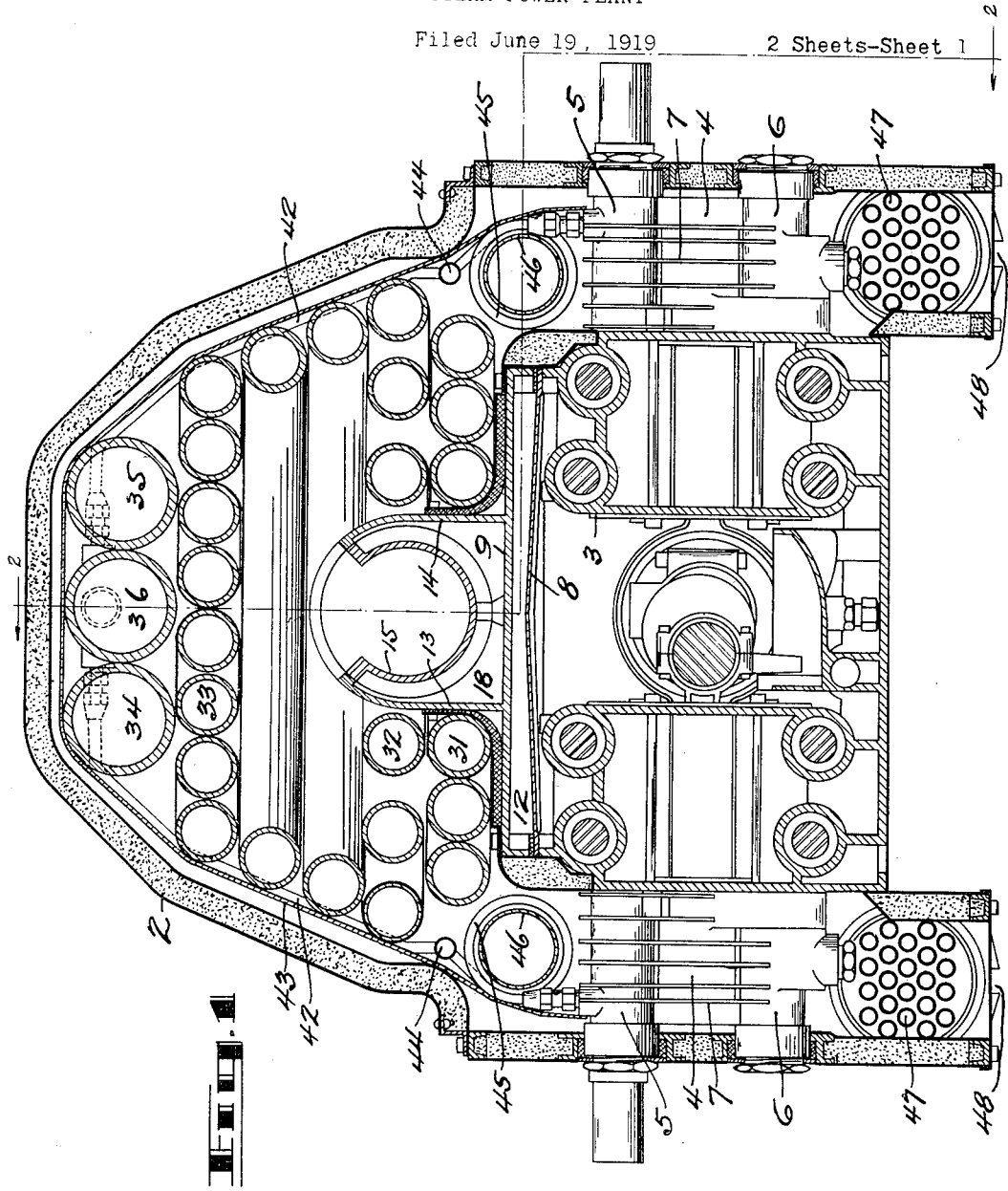

Patented May 22, 1923.

1,456,226

UNITED STATES PATENT OFFICE.

JOHN A. DOBLE, OF SAN FRANCISCO, CALIFORNIA, ASSIGNOR TO DOBLE LABORATORIES, OF SAN FRANCISCO, CALIFORNIA, A CORPORATION OF CALIFORNIA.

STEAM-POWER PLANT.

Application filed June 19, 1919. Serial No. 305,285.

*To all whom it may concern:*

Be it known that I, JOHN A. DOBLE, a citizen of the United States, and a resident of the city and county of San Francisco, State of California, have invented a certain new and useful Steam-Power Plant, of which the following is a specification.

The invention relates to a steam power plant and more particularly to a combination of burner, steam generator and steam engine.

An object of the invention is to provide a highly efficient steam power plant.

Another object of the invention is to provide a unit structure comprising a burner, a steam generator and a steam engine.

A further object of the invention is to provide a compact steam power plant for propelling vehicles such as tractors, trucks and automobiles.

The invention possesses other advantageous features, some of which, with the foregoing, will be set forth at length in the following description, where I shall outline in full, that form of the invention which I have selected for illustration in the drawings accompanying and forming part of the present specification. In said drawings, I have shown one specific form of the apparatus of my invention, but it is to be understood that I do not limit myself to such form, since the invention, as set forth in the claims, may be embodied in a plurality of forms.

Referring to said drawings:

Figure 1 is a vertical transverse section through the power plant of my invention.

Fig. 2 is a side elevation and section of the power plant taken on the line 2—2, Fig. 1.

The power plant of my invention comprises a burner, preferably a liquid fuel burner, a steam generator and a steam engine, all arranged within one casing, to form a unit structure. The power plant is arranged so that the engine cylinders are exposed to the hot gases of combustion after they have contacted with the boiler tubes and so that the crank case of the engine is shielded from the hot gases and kept comparatively cool. The power plant shown in the drawings embodies a twelve cylinder steam engine, since an engine of this type shows great economy under vehicle propulsion operation, but it is to be understood that I do not limit myself to any specified number of cylinders, since an engine having one or more cylinders may be employed.

The power plant comprises a shell or casing 2 of heat insulation material, within which the various units of the plant are disposed. The steam engine is disposed longitudinally with the casing 2 and comprises a crank case 3, to which the cylinders 4 and inlet and exhaust valve casings 5 and 6 are suitably secured. The crank case 3 is of less width than the casing 2, so that passages for the gases of combustion are provided on each side of the crank case and the cylinders and valve casings are disposed in these passages, so that they are in direct thermal communication with the hot gases of combustion. The cylinders 4 and inlet valve casings 5 are provided on their outer surfaces, within the gas passages, with heat conducting fins 7, to facilitate the transfer of heat from the gases to the steam.

The crank case is closed at the top by the plate 8 and arranged above and spaced from the plate 8 is a plate 9 which, with the lower plate, forms a passage 12, for the air which forms part of the combustible fuel mixture. The air in passing through this passage 12 not only keeps the plate 8 cool, but becomes itself heated, thereby producing more efficient combustion. Springing upwardly from the plate 9, and preferably integral therewith, are two parallel walls 13—14 extending longitudinally of the engine, which are curved or sloped inwardly toward each other at their upper ends. Arranged between the walls 13—14 and separated therefrom, except at their upper ends and spaced from the plate 9, is a semi-cylindrical burner chamber 15, which is open along its upper side to permit the discharge of the gases of combustion. The burner chamber 15 is of less length than the engine and is closed at its rear end with a wall 16, behind which is formed a chamber 17 which opens into the passage 12 and into the passage 18 formed between the burner chamber and the plate 9 and walls 13 and 14. At the forward end the burner is cylindrical in shape, being closed at the top by the wall 19, which is integral therewith. An upward extension 21 of the walls 13—14 overlies the wall 19 and is spaced therefrom at the center, forming a passage 22 which is in communication with the passage 18. At its forward end the burner is provided with a plurality of air inlet holes 23, spaced about circumferentially through which air passes from the passage 18 and its extension 22. At the forward end of the burner is a blower housing 24, containing a blower driven by the motor 25, from which air is driven through the passages 12, 17, 18 and 22 and the holes 23, into the forward end of the burner chamber. During the operation of the burner, the walls thereof become highly heated and this heat is imparted to the air flowing through the passages, so that it becomes highly heated before it enters the burner where, on account of its high temperature, it acts to rapidly vaporize the liquid fuel.

The liquid fuel, which may be kerosene, distillate or other hydrocarbon fuel, is introduced into the rotating cup or bowl 26, whence it discharges in a fine spray into the entering hot air stream. The cup 26 is driven by the motor 25 and is disposed at the front end of the burner in the zone of the holes 23, so that the spray is intimately mixed with the heated incoming air. The rotating cup burner and the means for igniting the combustible mixture are fully disclosed in my co-pending application Serial No. 217,077 filed in the United States Patent Office on February 14, 1918, to which reference is hereby made.

The flame from the burner discharges upwardly into the combustion chamber, in which the tubes are spaced away from the burner outlet to permit complete combustion of the fuel. In the present construction the tubes are arranged in series, so that in effect they constitute one tortuously bent tube, which forms a crown around the burner. Tubes are arranged on opposite sides of the burner, below the discharge opening therein, thence up along the casing 2 and thence across the combustion chamber. The water preferably enters the inner tube 31 of the lower layer and flows through the tubes of this layer, then passes up into the inner tube 32 of the second layer, through the tubes of the second layer and then on upwardly into the tubes 33 of the top layer which are disposed in contiguous relation across the combustion chamber. Disposed above the tubes 33 are three large tubes or steam drums 34, 35, 36, through which the steam passes successively before it is discharged. The tube 34 is connected to the end of the series tube 33 and steam passes from tube 34 into tube 35 and thence into tube 36. The three large tubes are normally free from water, but upon the occasion of a large steam demand, water may flow into the tube 34, but it does not reach tube 36. Arranged within tube 36, is a strainer 37 for preventing boiler scale or other material from being discharged with the steam. The discharge of steam is controlled by the throttle valve 38, arranged within the tube 36 and operated by rotating the screw-threaded valve stem 39. The steam, after passing the throttle valve, enters the steam chamber 41, whence it discharges through suitable conduits.

The engine shown in the drawings is of the opposed cylinder type and two conduits 42 are used to convey the steam from the steam chamber. The conduits are disposed within the boiler casing, so that they are exposed to the gases of combustion. Overlying the steam and water tubes is a blanket 43 of asbestos or similar material, which opposes the outward flow of heat to the casing 2. Arranged longitudinally of the combustion chamber, preferably in the plane of the lower row of tubes, and on each side thereof, are manifolds 44, into which the conduits 42 discharge. The tubes in the lower row are contiguous, with the end tubes spaced from the walls of the casing, and the tubes in the next row are spaced so that the gases of combustion pass downward, outside of the end tubes in the lower row. The manifolds 44 are disposed in the path of the gases.

Arranged below the manifolds and in the direct path of the downwardly flowing gases of combustion, are superheater coils 45, connecting the manifold with the inlet valve casing of the engine. A separate superheater coil is provided for each cylinder, so that during the operation of the engine, the flow of steam through the superheater coils is intermittent, thereby providing an opportunity for superheating. The hot gases of combustion, passing over these coils, effectively superheat the steam on its way to the cylinders.

Extending longitudinally of the boiler and disposed within the curvature of the superheater coils are water tubes 46 which are connected to the feed water heaters and to the lower boiler tubes. The feed water heaters 47 are disposed within the gas passages below the cylinders. The cooled gases discharge from the bottom of the gas passages through vents 48.

I claim:

1. The combination with a steam boiler casing, of a steam engine having cylinders and a crank case arranged within said boiler casing, the engine cylinders being in direct thermal contact with the gases of combustion in said boiler casing.

2. The combination with a steam boiler casing, of a steam engine having cylinders and a crank case arranged within said boiler casing, the engine cylinders being in direct thermal communication with the gases of combustion in the boiler casing and the crank case being heat insulated from said gases.

3. The combination of a steam boiler, a liquid fuel burner associated with said boiler and a steam engine comprising cylinders and a crank case and a heat insulating casing enclosing said boiler, burner and engine.

4. The combination with a heat insulating enclosing casing, of a water tube boiler arranged within said casing, a liquid fuel burner associated with said boiler and arranged within said casing, and a steam engine. having cylinders arranged in said casing and exposed to the hot gases of combustion from the burner.

5. The combination with a heat insulating enclosing casing of a tube in which steam is adapted to be generated, disposed within said casing at the upper part thereof, a liquid fuel burner arranged below said tube and within said casing and a steam engine having cylinders exposed to the hot gases of combustion arranged within the casing below the burner.

6. A steam power plant comprising a casing, a tube in which steam is generated arranged within said casing, a burner arranged within said casing adapted to heat said tube, a steam engine arranged within said casing, cylinders on said engine lying in the path of the hot gases from said burner, and means for passing a stream of air between the burner and the engine.

7. A steam power plant comprising a boiler, a burner and an engine arranged in one casing, cylinders on said engine lying in the path of the gases of combustion from said burner, and walls forming a passage for air for the burner interposed between the burner and the engine.

8. A steam power plant comprising a boiler, a burner arranged within said boiler, an engine arranged below the burner, a casing enclosing the boiler, the burner and the engine, an air passage surrounding and opening into the burner and a second air passage disposed between the burner and the engine and opening into said first air passage.

9. A steam power plant comprising a boiler, a liquid fuel burner arranged in said boiler, a casing enclosing said boiler and burner, an engine arranged within said casing, the cylinders of the engine lying in the path of the gases of combustion, and feed water heaters arranged in the path of the gases below the cylinders.

10. A steam power plant comprising a liquid fuel burner, boiler tubes arranged around and above said burner, a steam chamber arranged above said boiler tubes, a steam engine having cylinders, a steam superheater coil interposed between each cylinder and the steam chamber, and a casing enclosing all of said elements.

11. A steam power plant comprising an engine having a crank case with cylinders secured thereto, a liquid fuel burner arranged above the crank case, an air passage disposed between the burner and the crank case and opening into the burner, and means for causing a flow of air through said passage.

12. A steam power plant comprising a tube in which steam is adapted to be generated, a liquid fuel burner disposed in operative relation with said tube, a steam engine having a crank case and cylinders arranged below said burner, and a heat insulating casing enclosing said tube, burner and engine and spaced from said crank case whereby passages for the gases of combustion are formed on opposite sides of the crank case into which the cylinders extend.

13. A steam power plant comprising a tube in which steam is adapted to be generated, a liquid fuel burner disposed in operative relation with said tube, a steam engine having a crank case and cylinders arranged below said burner, a heat insulating casing enclosing said tube, burner and engine and spaced from said crank case whereby passages for the gases of combustion are formed on opposite sides of the crank case into which the cylinders extend and feed water heaters disposed in said passages below the cylinders.

14. A steam power plant comprising a boiler having a steam chamber, a liquid fuel burner operatively associated with said boiler, a steam engine having a plurality of cylinders, a steam manifold, a conduit connecting the manifold with the steam chamber, and a plurality of superheater coils disposed in the path of the gases of combustion of the burner connecting the manifold at spaced points directly with the cylinders.

15. A steam power plant comprising a boiler having a steam chamber, a liquid fuel burner associated with said boiler, a steam engine having a plurality of cylinders, a steam manifold, a conduit connecting the steam chamber with the manifold, a throttle valve controlling the flow of steam from the steam chamber into the conduit and a plurality of superheater coils disposed in the path of the gases of combustion of the burner, connecting the manifold at spaced points directly with the cylinders.

16. A steam power plant comprising a boiler having a steam chamber, a liquid fuel burner operatively associated with said boiler, a steam engine having a plurality of cylinders, a steam manifold, a conduit connecting the manifold with the steam chamber, a plurality of superheater coils connecting the manifold with the cylinders, the superheater coils and the cylinders being disposed in the path of the gases of combustion of the burner.

17. In a steam power plant, a boiler, a liquid fuel burner associated with said boiler, comprising a burner casing provided with apertures, a wall partly surrounding the burner casing and forming therewith an air passage communicating with said apertures, a steam engine arranged below said burner, spaced walls overlying said engine and forming therebetween an air passage in communication with said first air passage, and means for causing a flow of air through said passages and into the burner casing.

In testimony whereof, I have hereunto set my hand at San Francisco, California, this 12th day of June, 1919.

JOHN A. DOBLE.

In presence of—
H. G. Prost.